June 6, 1950 L. J. GRIFFIN 2,510,103

RADIO RECEIVING SET AND CABINET THEREFOR

Filed Nov. 29, 1947 2 Sheets-Sheet 1

INVENTOR
LAURENCE J. GRIFFIN
BY R P Morris
ATTORNEY

June 6, 1950 L. J. GRIFFIN 2,510,103

RADIO RECEIVING SET AND CABINET THEREFOR

Filed Nov. 29, 1947 2 Sheets-Sheet 2

INVENTOR
LAURENCE J. GRIFFIN
BY R. P. Morris
ATTORNEY

Patented June 6, 1950 2,510,103

UNITED STATES PATENT OFFICE 2,510,103

RADIO RECEIVING SET AND CABINET THEREFOR

Laurence James Griffin, Sidcup, Kent, England, assignor to International Standard Electric Corporation, New York, N. Y., a corporation of Delaware Application November 29, 1947, Serial No. 788,903
In Great Britain December 6, 1946

11 Claims. (Cl. 250—14)

The present invention relates to radio receivers and to cabinets therefor and particularly to cabinets of the type which are constructed of moulded plastic material or of pressed metal.

Large numbers of radio receivers of any one model are required at the present time to satisfy the public demand and it follows that mass production methods are desirable and should be extended to the manufacture of all possible components. Furthermore, it is desirable that the operation of assembly of the various components should be as simple and rapid as possible.

According to one feature the invention provides a radio receiver comprising in combination a self contained chassis portion carrying the components of the receiver including a loud speaker and tuning controls and connections, two identically shaped cabinet portions adapted to enclose said chassis portion, each of said cabinet portions comprising sound louvres or apertures for the loud speaker, an aperture or apertures for giving access to the tuning controls and connections, and projections on the chassis portion for engagement between the meeting edges of the cabinet portions.

According to another feature the invention comprises a cabinet for radio receivers formed of two identically shaped moulded or pressed half-cabinets fitting together.

The receiver chassis may be clamped in position within the cabinet by means of bearing surfaces in the moulded or pressed half-cabinets which close firmly over, and in contact with, projecting portions of the chassis when the two halves of the cabinet are held together.

An advantage of forming the cabinet of two identically shaped mouldings or pressings is that only one tool is required for producing the whole cabinet and furthermore that only half the cabinet is made at one operation. Thus the tool is smaller in size and simpler in construction and in use than in the normal manner of construction whereby the whole cabinet except for a back cover is made in one operation.

Another advantage of this invention is that it provides simple and rapid means of installing the complete chassis within the cabinet and of retaining it in position without the use of screws, bolts or similar fixing devices attached to, or passing through, any portion of the chassis itself.

The chassis can therefore be removed from the cabinet with great ease should any adjustment or repair become necessary.

Figure 1:
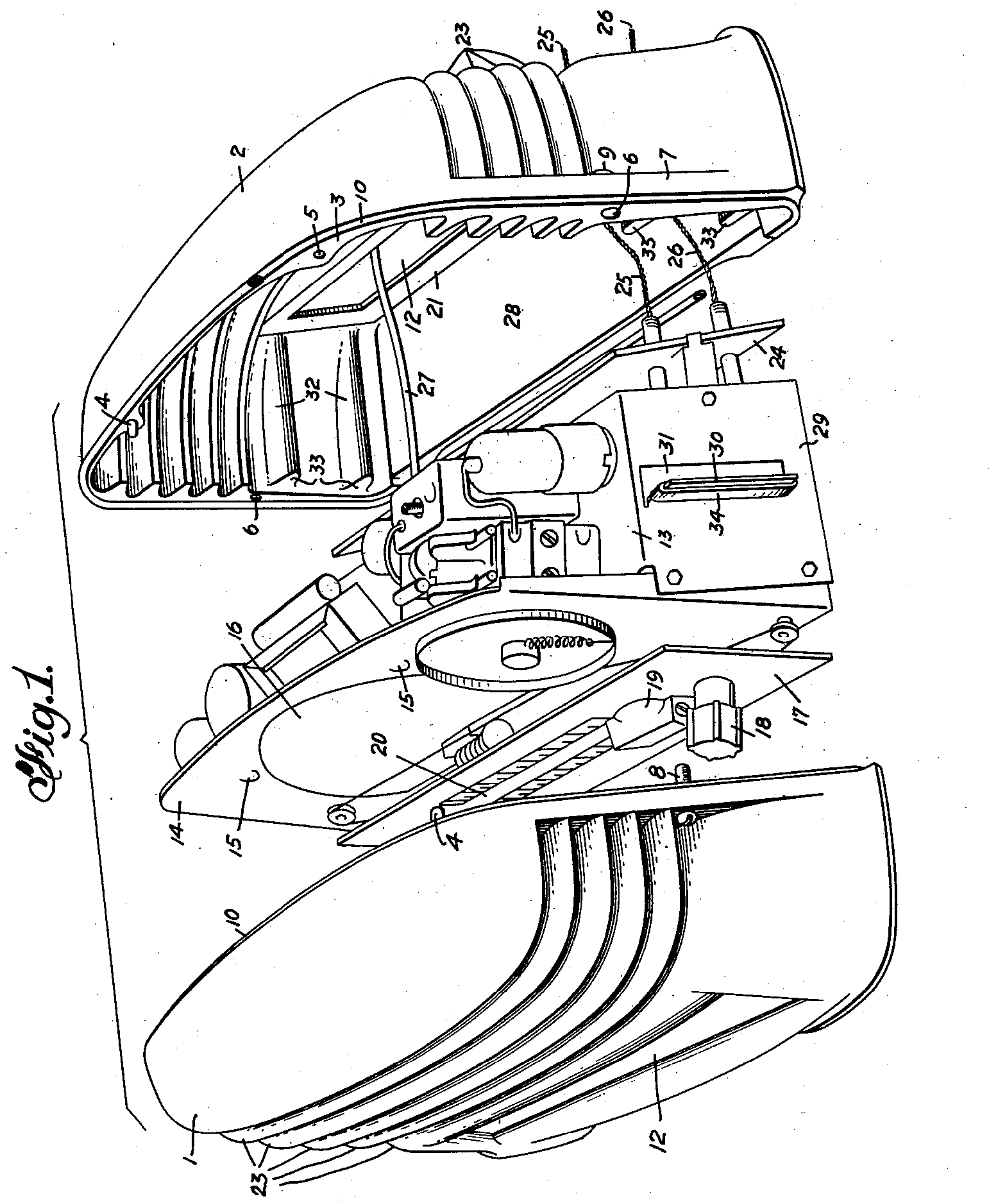
Figure 3:
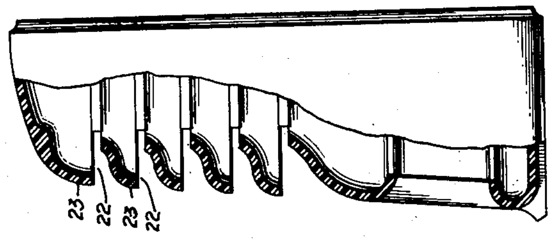
Figure 2:
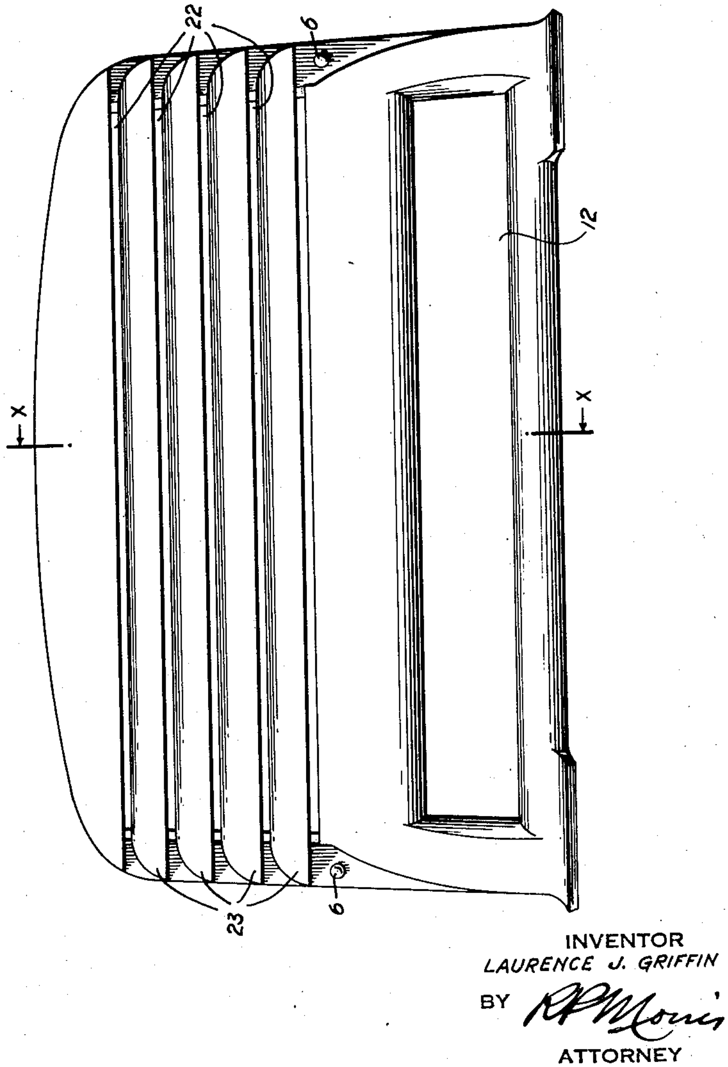

The invention will be better understood from the following description of one embodiment which should be read in conjunction with the drawings accompanying the specification, in which:

Fig. 1 shows an exploded perspective view of one form of radio receiver according to this invention including a typical chassis and two identically shaped cabinet portions, Fig. 2 shows a front elevation of the cabinet, the rear elevation being identical, Fig. 3 shows a part section through line X—X on Figure 2.

In Fig. 1 references 1 and 2 are identical moulded or pressed hollow half-cabinets which can be fitted together without overlap so as to abut along their plane edges 3, shown in the half-cabinet 1. Peg shaped projections 4 and holes 5 are provided as integral parts of the half-cabinets and when the two half-cabinets are pressed together with their plane edge surfaces 3 in contact, the pegs 4 fit into the holes 5 thus preventing any lateral movement of the half-cabinets with respect to one another.

Holes 6 are also provided in suitable flange like portions 7 of the half-cabinets and when the two half-cabinets are closed together to form a complete cabinet bolts 8 are passed through the corresponding holes 6 in the two half-cabinets and nuts 9 are screwed onto the said bolts and tightened up to hold the two half-cabinets together.

It is to be understood that if it is found desirable further holes may be provided in suitable positions in the half-cabinets to enable further bolts and nuts to be employed for holding the two half-cabinets together, or other means might be adopted such as a metal band passing around the two half-cabinets and having its ends suitably fastened together.

When the two half-cabinets are closed together the joint where the surfaces 3 are in contact would be visible.

For appearances sake rebates 10 are provided adjacent to the surfaces 3 and a fillet 11 of rubber or other suitable material is fitted into said rebates. This fillet may be coloured as desired for decorative purposes.

In order to allow access to the control knobs and tuning scale of the receiver, and to provide means of connecting the earth and antenna and power supply to the receiver, suitably shaped apertures are provided in the half-cabinets. These apertures 12 are shown in Figs. 1 and 2 as rectangular "windows" but they can be made of any other suitable shape.

For the purpose of showing how the chassis is fitted into the cabinet a completely assembled receiver chassis 13 is shown in Fig. 1. Details of the actual receiver and chassis are only described where they affect the mode of mounting the chassis within the cabinet.

On the front of the chassis 13 there is fixed a plate 14 behind which is mounted a cone loud speaker, the open end of which cone is attached to the back of said plate by means of screws 15. A portion 16, shown as part of a circle, is cut out from the plate 14 so that the plate forms the usual baffle for the cone loud speaker. In front of plate 13 there is mounted a rectangular panel 17 carrying any necessary control knobs such as those shown at 18 and 19 and a scale 20 on which the wave length to which the receiver is tuned is indicated in known manner.

The length and width of the rectangular panel 17 are slightly greater than the corresponding dimensions of the window aperture 12 and panel 17 is so positioned on the chassis that when the complete chassis, carrying with it said panel, is pressed forward into the front half-cabinet 1 the said panel registers with the window aperture 12 and a small margin around the edge of the front surface of panel 17 rests against a specially provided flat portion of the inner surface of the front half-cabinet 1 immediately surrounding the window aperture 12.

This flat surface can be seen at 21 in rear half-cabinet 2. When therefore the complete chassis is pressed forward into the front half-cabinet the controls 18 and 19 will project through the aperture 12 and the tuning scale 20 will be visible. The cut out portion 16 in plate 14 will be close to the upper part of the inner surface of the front half-cabinet 1.

Referring now to Figs. 2 and 3 it can be seen that apertures 22 are provided in the half-cabinets under the louvres 23. These apertures allow the sound waves produced by the loud speaker to pass freely out of the cabinet in all directions and also serve to provide ventilation for the interior of the cabinet.

Turning again to Fig. 1 it can be seen that a panel 24, which is of substantially the same length and width as panel 17 is mounted on the rear of the chassis 13 and this panel is so positioned that when the complete chassis is pressed backward into the rear half-cabinet 2 the panel 24 will register with the window aperture 12, and a small margin around the edge of the rear surface of the panel 24 will rest against the flat surface 21 in the rear half-cabinet. The panel 24 serves to carry suitable means of making connections between the receiver and leads connecting to an antenna, to earth and to a source of power supply. Thus there are shown an antenna connection 25, an earth connection 26 and a power supply connection 27 all of which can be connected to panel 24 by means of plugs and sockets or in any known way.

It will be seen that as shown in Fig. 1 the plate 14 and the panels 17 and 24 do not lie in planes which are perpendicular to the plane of the base 28 of the half-cabinets. For appearance sake it is desirable to make the exterior surfaces of the complete cabinet slope slightly inwards from the base towards the top and the angle of mounting of the said plate and said panels is selected to conform to the angle of slope adopted for the front and rear of the cabinet.

It can be seen that provided the distances between points on the outer surfaces of panels 17 and 24 respectively are equal to the distances between corresponding points on the flat surfaces 21 in the two half-cabinets the chassis will be locked in position when the two halves of the cabinet are closed over it and the bolts and nuts 8 and 9 are in position and tightened up. In order to ensure that the chassis is firmly held in position within the cabinet however it will usually be found preferable to provide some means of clamping it in position associated with the main body of the chassis rather than to depend on panels 17 and 24 which then need only be fairly lightly attached to the chassis. One such means is illustrated in Fig. 1. On the end plate 29 of the chassis a lug 30 projecting at right angles to said end plate is provided. This lug can be provided by welding or riveting an angle piece to the end plate 29 or as illustrated by cutting the metal of the end plate along one long and two short sides of a rectangle 31 and pressing the partially cut out rectangle of metal outwards through a right angle along the uncut side of said rectangle.

A similar lug (not shown) is provided at the far end of the chassis. Within the half-cabinets there are provided fins 32 integral with the body of the cabinet, terminating in flat end surfaces 33 is perpendicular to the plane of the base 28 of the half-cabinets. The flat end surfaces 33 are slightly set in from the plane edges 3 of the half-cabinets. When the half-cabinets are closed together over the complete chassis the lugs 30 are held between the flat end surfaces 33 of the two half-cabinets, the lugs at both ends of the chassis being so held. Thus the chassis is firmly clamped in position when the two half-cabinets are held together by the bolts and nuts 8 and 9.

In order to allow some manufacturing tolerance in the various dimensions and to ensure that the lugs 30 are firmly gripped between the flat bearing surfaces 33 said lugs are preferably covered with a padding 34 of resilient material such as rubber or felt.

Although in the embodiment described herein the means provided for holding the chassis in position consists of lugs on the end plates of the chassis clamped between suitable bearing surfaces provided in the half-cabinets, bearing surfaces in the half-cabinets might be provided to clamp lugs or projections on the chassis of a different shape from that described and illustrated and differently positioned on the chassis. Furthermore bearing surfaces can be provided in the half-cabinets to bear on portions of the chassis not specially provided for the purpose. Padding such as that shown at 34 can be provided on any parts of the chassis which are intended to be held by bearing surfaces provided in the half-cabinets or such padding could be attached to the bearing surfaces in the half-cabinets.

What we claim is:

1. A radio receiver comprising in combination a self contained chassis portion carrying the components of the receiver including a loud speaker and tuning controls and connections, two identically shaped cabinet portions comprising meeting edges and adapted to enclose said chassis portion, each of said cabinet portions comprising sound louvres or apertures for the loud speakers, an aperture or apertures for giving access to the tuning controls and connections, and projections on the chassis portion for locking engagement between the meeting edges of the cabinet portions.

2. A radio receiver according to claim 1 in which said chassis is provided with panels on two opposite sides for alignment with said apertures in said cabinet positions.

3. A cabinet for radio receiver chassis having projecting portions and formed of two identically shaped hollow moulded or pressed half-cabinets fitting together means for clamping the receiver chassis in position within the cabinet comprising the provision of bearing surfaces in the half-cabinets so-positioned that they close firmly over, and in contact with the projecting portions of the chassis when the two halves of the cabinet are held together.

4. A cabinet for radio receivers according to claim 3 in which said half-cabinets abut together along edges provided with holes, the two half cabinets being located with respect to one another in the finished cabinets by means of pegs in certain of said holes.

5. A cabinet for radio receivers according to claim 4 in which the said pegs and holes are formed in the moulding or pressing of said half-cabinets.

6. A cabinet for radio receivers according to claim 5 in which the two half-cabinets are fastened together by means of nuts and bolts the holes for said bolts being formed in the moulding or pressing of said half-cabinets.

7. A cabinet for radio receivers according to claim 3 in which a suitable padding material such as rubber or felt is provided between said bearing surfaces and said projecting portions.

8. A cabinet for radio receivers according to claim 3 in which said projecting portions are lugs standing out at right angles from the end plates of the receiver chassis.

9. A cabinet for radio receivers according to claim 3 in which apertures are provided in the half cabinets to permit of access to the controls of the receiver and to the tuning scale and to permit of connections being made between the receiver and the antenna and earth leads and the power supply.

10. A cabinet for radio receivers according to claim 9 in which apertures are provided in the form of louvres to permit acoustic waves to pass out from the cabinet and to allow for ventilation of the interior of the cabinet.

11. An arrangement according to claim 3, in which said projecting portions comprise lugs standing out at right angles from the end plates of the receiver chassis, said half cabinets comprising parallel spaced interior fins between which said lugs ride upon closing together said half cabinets.

LAURENCE JAMES GRIFFIN.

REFERENCES CITED

The following references are of record in the file of this patent:

UNITED STATES PATENTS

| Number | Name | Date |
|---|---|---|
| 188,566 | Barnes | Mar. 20, 1877 |
| 1,565,993 | Fitzpatrick | Dec. 15, 1925 |
| 2,158,641 | Stenberg | May 16, 1939 |
| 2,237,886 | McDonald, Jr. et al. | Apr. 8, 1941 |

FOREIGN PATENTS

| Number | Country | Date |
|---|---|---|
| 784,094 | France | Apr. 23, 1935 |